(12) United States Patent
Irie et al.

(10) Patent No.: US 8,219,556 B2
(45) Date of Patent: Jul. 10, 2012

(54) METADATA COLLECTING DEVICE, METHOD AND COMPUTER READABLE MEDIUM

(75) Inventors: Yuji Irie, Kawasaki (JP); Daisuke Ajitomi, Kawasaki (JP); Naoki Esaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 484 days.

(21) Appl. No.: 12/561,803

(22) Filed: Sep. 17, 2009

(65) Prior Publication Data
US 2010/0082622 A1    Apr. 1, 2010

(30) Foreign Application Priority Data
Sep. 26, 2008   (JP) ................................ 2008-247924

(51) Int. Cl.
*G06F 17/30*   (2006.01)

(52) U.S. Cl. ........ 707/736; 707/758; 707/769; 707/802; 707/803

(58) Field of Classification Search .................. 707/758, 707/769, 736, 802, 803
See application file for complete search history.

(56) References Cited

U.S. PATENT DOCUMENTS
8,024,340 B2 * 9/2011 Kageyama et al. ........... 707/736
2004/0187151 A1 * 9/2004 Dunstan ........................... 725/55
2008/0010497 A1 * 1/2008 Kronlund et al. ................. 714/6
2010/0063878 A1 * 3/2010 Bachet et al. .............. 705/14.49

FOREIGN PATENT DOCUMENTS
JP    2004-102767    4/2004

* cited by examiner

*Primary Examiner* — Phong Nguyen
*Assistant Examiner* — Dennis Myint
(74) *Attorney, Agent, or Firm* — Finnegan, Henderson, Farabow, Garrett & Dunner, L.L.P.

(57) ABSTRACT

A device of the invention includes a search inputting unit inputting a search object service and a search condition of content; a first search processing unit, when an accumulation method corresponding to an inputted search object service is a preliminary accumulation method, searching the metadata coincident with an inputted search condition in a first metadata storage; a second search processing unit, in case that the accumulation method corresponding to the inputted search object service is a search-based accumulation method, when the inputted search condition is registered in a second metadata storage in association with the inputted search object service, obtaining corresponding metadata from the second metadata storage, whereas when not registered, obtain and accumulate the metadata coincident with the inputted search condition in the second metadata storage in association with the inputted search condition; and a search-result displaying unit displaying the metadata acquired.

11 Claims, 12 Drawing Sheets

| ITEM | EXAMPLE |
|---|---|
| THE NUMBER OF CORRESPONDING SERVICE (n) | 5 |
| for(i=0;i<n;i++) { | |
| SERVICE NAME | VIDEO POSTING SERVICE |
| CACHING METHOD | Query-based Caching Method |
| THE MAXIMUM NUMBER OF CACHES | 500 |
| INFORMATION FOR METADATA OBTAINMENT | http://XXX/ContentA/content.xml |
| THE NUMBER OF REGISTRATION QUERY (m) | 10 |
| for(j=0;j<m;j++) { | |
| REGISTRATION QUERY | Genre= "SPORT" + Keyword = "TENNIS" |
| SEARCH FREQUENCY | 1/Month |
| VIEW FREQUENCY | 1/Month |
| RECOMMENDED UPDATE FREQUENCY | 24 hours |
| RECOMMENDED UPDATE TIME | PM10:00 |
| NEXT UPDATE TIME AND DATE OF CACHE | 2008/03/28 PM10:00 |
| CACHE EFFECTIVE PERIOD | 10 days |
| CACHE ERASURE TIME AND DATE | 2008/04/01 AM05:00 |
| } | |
| } | |

FIG. 8

| ITEM | EXAMPLE |
|---|---|
| THE NUMBER OF CORRESPONDING SERVICE (m) | 5 |
| for(i=0;i<n;i++) { | |
| SERVICE NAME | HIGH-QUALITY VoD SERVICE |
| CACHING METHOD | All Caching Method |
| THE MAXMUM NUMBER OF CACHES | -- |
| INFORMATION FOR METADATA OBTAINMENT | http://XXX/ContentA/content.xml |
| THE NUMBER OF REGISTRATION QUERY (m) | 1 |
| for(j=0;j<m;j++) { | |
| REGISTRATION QUERY | -- |
| SEARCH FREQUENCY | 100/Month |
| VIEW FREQUENCY | 40/Month |
| RECOMMENDED UPDATE FREQUENCY | 2 hours |
| RECOMMENDED UPDATE TIME | PM10:00 |
| NEXT UPDATE TIME AND DATE OF CACHE | 2008/03/28 PM10:00 |
| CACHE EFFECTIVE PERIOD | -- |
| CACHE ERASURE TIME AND DATE | -- |
| } | |
| } | |

FIG. 9

GENRE: SPORT ▷

KEYWORD: TENNIS

PROMOTION: ☐ NEWLY ARRIVED  ☐ RECOMMENDATION

SEARCH OBJECT SERVICE:
☐ BROADCAST SERVICE  ☑ HIGH-QUALITY VoD SERVICE  ☐ HOME CONTENT
☑ VIDEO POSTING SERVICE

[SEARCH]

FIG. 10

SEARCH RESULT

SEARCH CONDITION | GENRE: SPORT | KEYWORD: TENNIS

| SERVICE NAME | CONTENT NAME | TIME | TIME AND DATE |
|---|---|---|---|
| HIGH-QUALITY VoD SERVICE | CONTENT A | 180 MINUTES | 2008/04/05 |
| VIDEO POSTING SERVICE | CONTENT a | 30 MINUTES | 2008/04/05 |
| VIDEO POSTING SERVICE | CONTENT b | 45 MINUTES | 2008/04/04 |
| HIGH-QUALITY VoD SERVICE | CONTENT B | 120 MINUTES | 2008/04/04 |
| BROADCAST SERVICE | CONTENT 1 | 60 MINUTES | 2008/04/03 |

FIG. 11

| SERVICE NAME | THE NUMBER OF HOLDING CONTENT | CHARGE | FEATURE OF SERVICE |
|---|---|---|---|
| HIGH-QUALITY VoD SERVICE | TEN THOUSAND | CHARGED | THE NUMBER OF CONTENT IS LIMITED. CHARGED DISTRIBUTION SERVICE etc. |
| VIDEO POSTING SERVICE | TEN MILLION | FREE | THE NUMBER OF CONTENT IS EXTREMELY LARGE. YouTube etc. |
| BROADCAST SERVICE | A THOUSAND | FREE | BECAUSE WEEK'S WORTH OF CONTENT, THE NUMBER OF CONTENT IS SMALL. ADDITIONALLY, THE UPDATE TIME HAS BEEN DETERMINED. |
| HOME CONTENT DISTRIBUTION | 100 | FREE | AIMED AT CONTENT STORED IN HOME DVD RECORDER etc. (DISTRIBUTED BY DLNA) |

FIG. 12

METADATA COLLECTING DEVICE, METHOD AND COMPUTER READABLE MEDIUM

CROSS REFERENCE TO RELATED APPLICATIONS

This application is based upon and claims the benefit of priority from the prior Japanese Patent Application No. 2008-247924, filed on Sep. 26, 2008, the entire contents of which are incorporated herein by reference.

BACKGROUND OF THE INVENTION

1. Field of the Invention

The present invention relates to a metadata collecting device, a method therefore and a computer readable medium storing a program for performing the method, for efficiently collecting and accumulating, for example, metadata of content, and for effectively updating the accumulated (cached) metadata.

2. Related Art

In recent years, in the context of the spread of broadband, multimedia-content distribution services using IP (Internet Protocol) communication are operated by various communication service providers. Provided are a wide variety of services ranging from a low-resolution video distribution service for a mobile phone to a high-resolution video distribution service having HD (High Definition) quality for a digital television.

The multimedia-content distribution services include a VoD (Video on Demand) video distribution service in which videos are distributed in unicast. This service is roughly classified into two types of that using a portable service and that using ECG (Electronic Content Guide), as a navigation of search/selection of content.

The portal service is a service for performing the navigation on a WEB browser provided by a service provider. A user accesses to the WEB page called "Portal" provided by the respective service providers to search/select desired content, and then, receive video streams. In the portal service, a content search or the like are all performed on a server, and its result is presented to the user on the WEB page.

On the other hand, ECG is an application on a receiving device, and obtains program information called as metadata and selects desired one among a certain number of metadata, and then, provides to the user an interface for search, display, selection, view, and purchase. A service using ECG takes a configuration in which the metadata becoming a key part needed for the navigation has been previously accumulated on the receiving device, and is used. The service using ECG, thus, has an advantage to operate at a high speed, compared with the portal service required to obtain also screen structure information on a site including image information. Moreover, the service using ECG has also an advantage or the like that a receiver side can determine a screen design; operation or a screen transition using a receiver remote control, which cannot be realized by a browser, is enabled etc. Further, in the service using ECG, it is possible to realize a multiservice navigation by collecting metadata from a plurality of services, merging those metadata, and then, presenting the metadata to the user. Examples for realizing this multiservice navigation include a technology disclosed in JP-A 2004-102767 (Kokai).

In JP-A 2004-102767 (Kokai), a metadata collecting device has previously collected and cached metadata from a plurality of metadata providing devices, and when a receiving device requests for metadata obtainment to the metadata collecting device, the metadata held by these metadata providing devices is returned to the receiving device in a unified format.

In JP-A 2004-102767 (Kokai), in a case where it is necessary to update the metadata requested by the receiving device, in other words, a case where there is a discrepancy between the cached metadata and the metadata retained by the metadata providing device, it is required to obtain the metadata from the metadata providing device again. Therefore, a service in which the metadata are frequently updated has a problem that a hit rate by cache becomes low, and accordingly, this gives rise to a need for collecting the metadata from the metadata providing device again, thereby requiring time until content are displayed on the receiving device.

Additionally, in JP-A 2004-102767 (Kokai), supposed is a configuration in which the metadata collecting device is arranged on a server side, so that it is not possible to make content accumulated in a home HDD recorder be a search object. Further, all of the metadata are obtained from the metadata collecting device, so that it is not possible to adapt the technology to a consumer device such as a digital television having a large restriction in capacity or the like of a hard disk, a memory.

As stated above, in a case where the number of content provided by the service is extremely large, it is difficult to apply caching of all the content to the consumer device such as the digital television having a large restriction in capacity or the like of the hard disk, the memory. Additionally, the service in which content are frequently updated faces also a problem that a cache hit rate becomes low, thereby giving rise to the need for obtaining the metadata from the metadata providing device again, and accordingly, spoiling light operational feeling.

SUMMARY OF THE INVENTION

According to an aspect of the present invention, there is provided with a metadata collecting device which collects and accumulates metadata from one or more metadata providing devices holding metadata of contents distributed by one or more content distribution services, comprising an accumulation-method determiner, an accumulation-method storage, a metadata-obtainment processing unit, a first metadata storage, a search inputting unit, a second metadata storage, a first search processing unit, a second search processing unit and a search-result displaying unit. The accumulation-method determiner determines accumulation methods of the metadata for the content distribution service to either a preliminary accumulation method or a search-based accumulation method, respectively. The accumulation-method storage stores therein information on the accumulation methods determined for the content distribution services. The metadata-obtainment processing unit transmits, to the metadata providing device relevant to a first content distribution service for which the preliminary accumulation method has been determined, an obtainment request of the metadata held by the metadata providing device and to obtain the metadata returned from the metadata providing device. The first metadata storage stores therein the metadata obtained by the metadata-obtainment processing unit in association with the first content distribution service. The search inputting unit inputs a search object service which is the content distribution service to be searched and a search condition of the contents, respectively. The second metadata storage stores, with respect to a second content distribution service for which the search-based accumulation method has been determined, the search condition having been ever searched and metadata obtained corresponding to the search condition, in association with the second content distribution. The first search processing unit, when the accumulation method corresponding to an inputted search object service is the preliminary accumulation method, searches the metadata coincident with an inputted search condition based on the inputted search object service in the first metadata storage. The second search processing unit determines whether or not the inputted search object service and the inputted search condition is registered in the second metadata storage when the accumulation method corresponding to the inputted search object service is the search-based accumulation method. The second search object service, when registered, obtains the metadata coincident with the inputted search condition based on the inputted search object service from the second metadata storage, and whereas when not registered, transmits, to the metadata providing device relevant to the inputted search object service, an obtainment request of the metadata coincident with the inputted search condition and accumulates the metadata returned from the metadata providing device in the second metadata storage in association with the inputted search condition. The search-result displaying unit displays the metadata acquired by the first or the second search processing unit.

BRIEF DESCRIPTION OF THE DRAWINGS

FIG. 8 is a diagram showing an example of service information accumulated in a service/metadata information accumulator.

FIG. 9 is a diagram showing an example of the service information accumulated in the service/metadata information accumulator.

FIG. 10 is a diagram showing an example of a content search screen.

FIG. 11 is a diagram showing an example of a screen for displaying a search result.

FIG. 12 is a diagram showing an example of a service list.

DETAILED DESCRIPTION OF THE INVENTION

An embodiment according to the present invention will now be explained with reference to the accompanying drawings.

Figure 1:
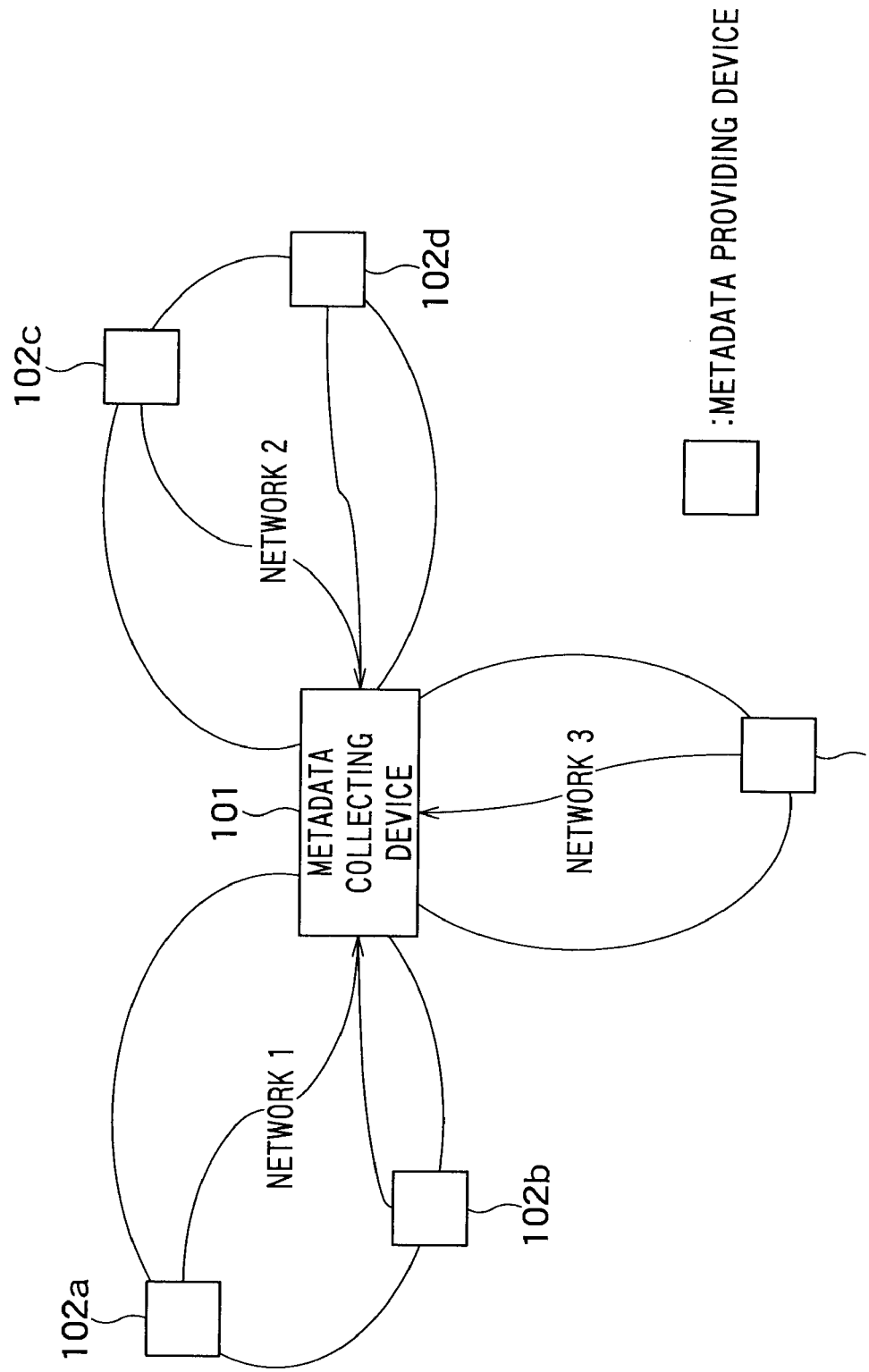
FIG. 1 is a block diagram showing a structure of a content distribution system according to an embodiment of the present invention.

FIG. 1 is an overall view of a content distribution system according to an embodiment of the present invention.

A metadata collecting device 101 serving as one embodiment of the present invention is connected to a plurality of networks 1 to 3. One or more metadata providing devices 102a to 102e are connected to each of the networks 1 to 3.

Hereinafter, firstly explained are summaries on the metadata providing devices 102a to 102e, the metadata collecting device 101, and the networks 1 to 3, and, thereafter, the metadata collecting device 101 will be explained in detail.

Each of the metadata providing devices 102a to 102e provides metadata on content relevant to a corresponding content distribution service. Metadata is not content itself, and shows attribute information on the content. When the content is image data, audio data, a WEB page or the like, its metadata is, for example, a title (identifier), details information, a creation time and date, a content location or the like. Note that it makes no difference whether a metadata description format is a standard specification or a format unique to each service.

Each of the metadata providing devices 102a to 102e is a metaserver operated by a content distribution service provider, a content holding device such as a HDD (Hard Disk Drive) recorder, or a local storage connected to the metadata collecting device 101.

FIG. 12 shows an example of the content distribution service. For example, the metadata providing device 102a provides the metadata on the content distributed by a high-quality VoD service, and the metadata providing device 102b provides the metadata on the content distributed by a video posting service. As stated above, there are a wide variety of services ranging from the service having an extremely large number of content to one in which the number of content is limited. Differences between those services include the follows.

The number of holding content is larger/smaller.

Charged/Free

Home content/Content on an outside network

Update frequency is lower/higher.

The metadata collecting device 101 is a device for collecting and controlling the metadata from the metadata providing devices 102a to 102e. The metadata collecting device 101 is, for example, a device such as a television or a personal computer (PC) equipped with a video display function, or a device for collecting and controlling the metadata instead of the device (e.g., the television or the PC). In the metadata collecting device 101, a metadata collection application such as an ECG application has been started, and this application manages metadata collection. The present embodiment has one feature that in view of resources of the metadata collecting device 101, the metadata is accumulated on the metadata collecting device 101 as much as possible, thereby reducing time required for the metadata collection from the metadata providing device. This leads to realization of a high-speed navigation function for searching and viewing video content from the plurality of content distribution services in a consumer device such as a digital television.

The plurality of networks 1 to 3 are networks different from each other. The different networks mean those as follows.

The different networks operated by different network provider (i.e. carrier)

The different networks operated by the same network provider.

Local area network

The different networks operated by the different providers mean that, for example, a case of the network 1 operated by a network provider A and the network 2 operated by a network provider B. As stated above, such physically different networks are handled as the separate networks.

The different networks operated by the same network provider mean a case like the different networks depending on service quality or the like operated by the same network provider. It is a case, for example, where the network 1 is a network of which quality is managed, whereas the network 2 is a best-effort network of which quality is not managed, alternatively, a case where the network 1 is an IPv6 network, whereas the network 2 is an IPv4 network. As stated above, the physically or logically different networks are handled as the separate networks.

The local area network is, for example, a home network closed within home. As stated above, the home network and an outside network are handled as the separate networks.

Hereinafter, the metadata collecting device 101 will be explained in detail.

Figure 2:
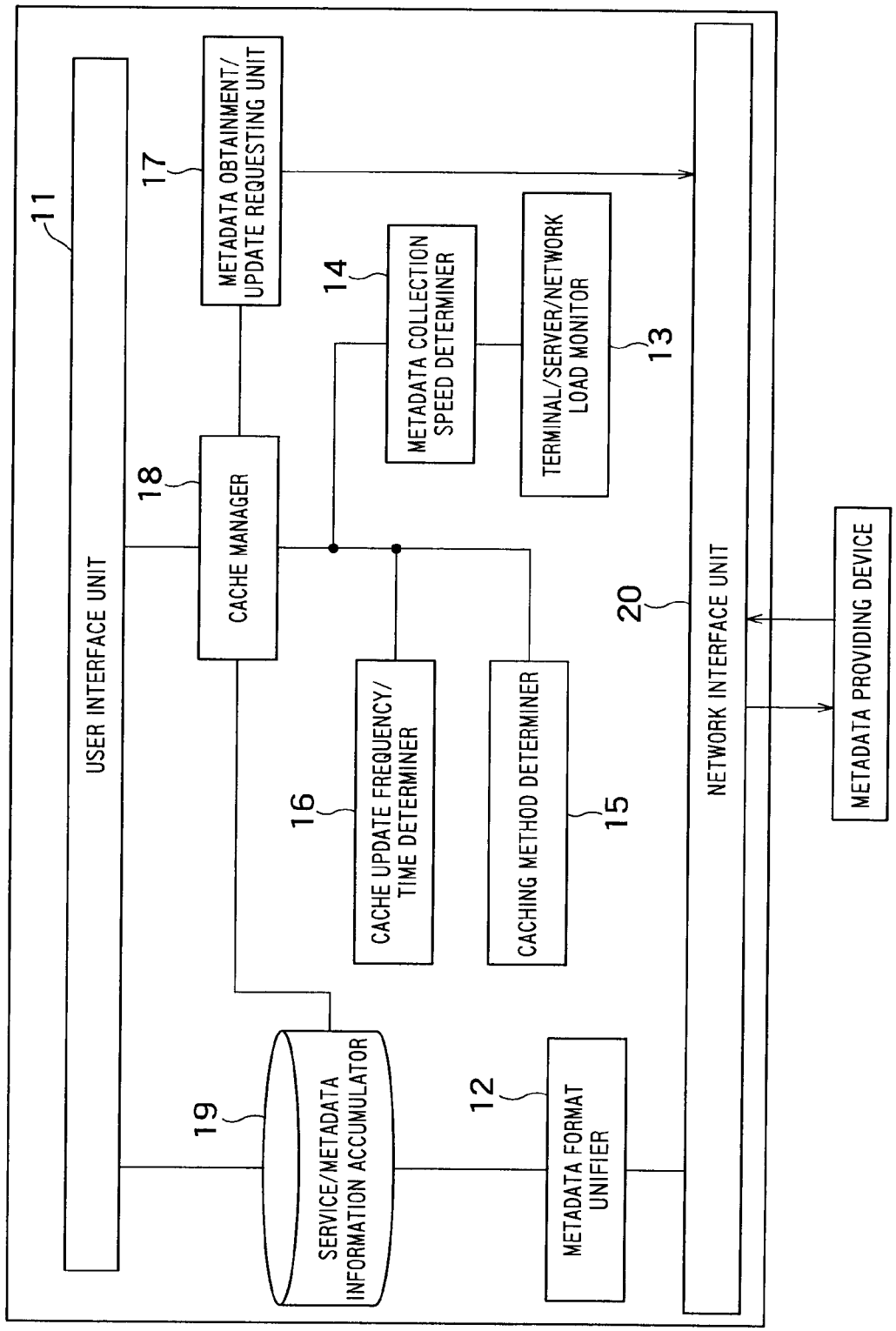
FIG. 2 a block diagram showing a structure of a metadata collecting device according to the embodiment of the present invention.

FIG. 2 is a functional block diagram of the metadata collecting device. Each of functional blocks will be explained below.

[User Interface Unit 11]

A user interface unit 11 provides an input interface in order for a user to input a search condition and a search object service for desired content, as well as an output interface for displaying a content list (a list of titles etc.) serving as a search result. FIG. 10 shows an example of a content search screen for inputting a search condition and a search object service of content. FIG. 11 shows an example of a screen for displaying a search result including a list of the searched content. The user interface unit 11 includes a search inputting unit for inputting a search condition and a search object service, as well as a search result display for displaying a search result representing the metadata obtained depending on the search condition and the search object service, of the present invention.

[Network Interface Unit 20]

A network interface unit 20 is an interface unit for transmitting/receiving information to/from the metadata providing devices 102a to 102e through the networks 1 to 3. Concretely, it is the interface unit for transmitting packets of a metadata obtainment request to the metadata providing devices 102a to 102e and for receiving packets of the metadata from the metadata providing devices 102a to 102e.

[Metadata Format Unifier 12]

A metadata format unifier 12 unifies formats collected from the plurality of metadata providing devices 102a to 102e, and then, accumulates in a service/metadata information accumulator 19a the metadata of which formats have been unified. That is, the metadata format unifier 12 accumulates in the service/metadata information accumulator 19 the metadata collected per service by the absorption of a difference in the formats of the metadata.

[Terminal/Server/Network Load Monitor 13]

A terminal/server/network load monitor 13 monitors a CPU (Central Processing Unit) load on the metadata collecting device 101, a situation of other applications which are in operation in the metadata collecting device 101, or an influence due to a disturbance such as a network load or a server load. The monitoring of the situation of other applications includes, for example, monitoring of an operational situation of a video receiving application or a video displaying application or the like of which operation will be extremely influenced by the metadata collection.

[Metadata Collection Speed Determiner 14]

A metadata collection speed determiner 14 determines a metadata collection speed depending on the various load situations monitored by the above load monitor 13. Here, the metadata collection speed means the number of metadata (i.e. metadata quantity) per one request, or the metadata collection speed per unit time (for example, the number of metadata obtained per one minute). Hereinafter, the metadata collection speed shall mean the number of metadata collection per one request.

The metadata collection speed determiner 14 determines the metadata collection speed based on the following indexes.

(1) The CPU load on its own device, a starting situation of other applications (2) The network load (3) The server load Explained below is how the metadata collection speed is determined depending on these various loads.

(1) The CPU Load on its Own Device, the Starting Situation of Other Applications When the CPU load on its own device is heavy, or other applications (for example, the video receiving application, the video displaying application) are started, the application being started may be influenced due to the metadata collection, so that the number of metadata obtained per one request is decreased, or the metadata is obtained again after elapse of a little more time etc., thereby collecting the metadata slowly. On the contrary, when the CPU load is light, or other applications are not started, the influence due to the metadata collection is small, so that the number of metadata collection per one request is increased, thereby collecting the metadata in a short time.

For example, during a time when the video display application is started, the metadata collection speed is five per one request, whereas during a time when the video display application is not started, the metadata collection speed is one hundred per one request etc. This enables to collect the metadata while minimizing the influence on the video display application on which the metadata collection will largely affect.

(2) The Network Load

In a case where available network bands are few; packet losses frequently occur; or jitter of packets is large, it is highly likely that the network load is becoming heavy. If a large amount of metadata is obtained under such situation, the situation is likely to become further worsened due to an occurrence of congestion or the like. In order to avoid this, in a case where the network load is assumed to be heavy because the available network bands are few; the packet losses frequently occur; or the jitter in packets is large etc., the number of metadata collection per one request is decreased, or the metadata is obtained again after elapse of a little more time, thereby collecting the metadata slowly. On the contrary, when the CPU load is assumed to be light, the number of metadata collection per one request is increased, thereby collecting the metadata in a short time.

(3) The Server Load

When metadata is collected from the metadata providing device, the load on the metadata providing device largely influences the metadata collection. For example, in a case where the load on the metadata providing device is extremely heavy, there may an occurrence of a problem that a request timeout occurs and a display of the metadata is delayed due to the effect of the request timeout or the like. In order to avoid the problem, in a case where the load on the metadata providing device is estimated to be heavy judging from a response speed or a time required until the metadata is obtained, the number of metadata collection per one request is decreased, or the metadata is obtained again after elapse of a little more time, thereby collecting the metadata slowly. On the contrary, when the CPU load on the metadata providing device is assumed to be light, the number of metadata collection per one request is increased, thereby collecting the metadata in a short time.

As explained above, the metadata collection speed determiner 14 determines the metadata collection speed in consideration of the loads on the terminal/server/network described in (1) to (3), thereby enabling to efficiently collect the metadata without influencing other applications.

[Service/Metadata Information Accumulator 19]

A service/metadata information accumulator 19 accumulates therein metadata obtained from the metadata providing devices 102a to 102e.

Additionally, the service/metadata information accumulator 19 accumulates therein service information per service as shown in FIGS. 8 and 9. The service/metadata information accumulator 19 is configured by, for example, a hard disk or a nonvolatile memory.

The service information shown in FIGS. 8 and 9 include the following items.
- Corresponding service number
- Corresponding service name
- Caching method
- The maximum number of caches
- Information for metadata obtainment
- Registration query number
- Registration query
- Search frequency
- View frequency
- Recommended update frequency (cache update frequency)
- Recommended update time (cache update time)
- Next update time and date of cache
- Cache effective period
- Cache erasure time and date "Corresponding service number" represents the number of registered services. In each example of FIG. 8 and FIG. 9, five services are registered. The video posting service, which is one of these five services, is shown in FIG. 8, whereas the high-quality VoD service, which is another one, is shown in FIG. 9.

"Corresponding service name" represents a name of the registered service. That is, it represents the name of the service intended by the metadata collection application like ECG.

"Caching method" represents a caching method (accumulation method) in a caching method determiner (accumulation-method determiner) 15 which will be explained later on. The caching methods include Query-based Caching Method and All Caching Method. Simply put, All Caching Method (all caching method) is a method which has previously cached all of the metadata held (provided) by the service, whereas Query-based Caching Method is a method which caches solely several ones of the maximum number or all with respect to a searched search condition (a search formula) every time a search is performed. Query-based Caching Method corresponds to "a search-based accumulation method" of the present invention, whereas All Caching Method corresponds to "a preliminary accumulation method" of the present invention. The details on these caching methods will be explained later on. A portion which stores therein the caching method in the service/metadata information accumulator 19 corresponds to "accumulation method storage" of the present invention.

"The maximum number of caches" represents the upper-limit number of cache(s) per search in a case of Query-based Caching Method. Metadata is obtained until this upper-limit number, and is cached.

"Information for metadata obtainment" is information needed for obtaining the metadata from the metadata providing device. For example, a URL (Uniform Resource Locator) for metadata obtainment provided by the metadata providing device, or an API (Application Programming Interface) for metadata collection prepared by the metadata collection application such as the ECG application in order to obtain the metadata of each service or the like corresponds to the information for metadata obtainment.

"Registration query" is the search condition which has been ever searched. Note that, as will be explained later on, only when the caching method is Query-based Caching Method, the searched search condition is registered as the registration query. Here, the search condition is a combination of "Genre" and "Keyword", and is the combination of, for example, "Genre: sport, Keyword: tennis" etc. Note that, not limited thereto, it may be the combination of promotional information such as "Recommendation" and "Newly arrived" (see FIG. 10).

"Registration query number" represents the number of the registration queries in a case of Query-based Caching Method. In the example of FIG. 8, ten registration queries are registered. A set of Items (from "Registration query" to "Cache erasure time and date") is prepared per registration query, and ten registration queries exist in the example of FIG. 8, so that prepared are the ten sets (from "Registration query" to "Cache erasure time and date"). Note that in a case of All Caching Method, "1" is fixedly set in the number of registration queries.

"Search frequency" represents a search frequency per registration query or per service. When the caching method is Query-based Caching Method, "Search frequency" represents the search frequency per registration query, whereas when the caching method is All Caching Method, "Search frequency" represents the search frequency per service.

"View frequency" represents a view frequency of corresponding content per registration query or per service. For example, when a frequency of viewing content by tracing a link from metadata obtained by a search based on a certain registration query totally amounts to X times, the view frequency is X.

"Recommended update frequency" and "Recommended update time" represent an update frequency and an update time of a cache, respectively. In more details, the recommended update frequency is an interval from a last update time and date to a next update time and date, whereas the recommended update time is a period of time for updating a cache. Examples thereof include "Recommended update frequency: Per 1 hour", "Recommended update time: AM10:00" etc. Each of the recommended update time and the recommended update frequency may be a value determined in a cache update frequency/time determiner 16 which will be explained later on, or may have been previously registered in the service/metadata information accumulator 19.

"Next update time and date of cache" is a time and date when a cache should be updated next, and is determined in a cache manager 18, which will be explained later on, by using the last update time, the recommended update frequency and the recommended update time.

Here, each of "Recommended update frequency" and "Recommended update time" corresponds to, for example, "an update requirement" of the present invention. In particular, the recommended update frequency corresponds to "an update frequency of a metadata storage" of the present invention, whereas the recommended update time corresponds to "an update period of time of the metadata storage" of the present invention. Alternatively, "Next update time and date of cache" may correspond to the update requirement of the present invention. In an explanation which will be described later on, employed is the next update time and date of cache which is an index having reflected the recommended update frequency and the recommended update time as the update requirement. Note that any update requirement of the present invention would be acceptable, if only the update requirement were the one which had determined a momentum for updating a cache, and is not limited to the "Recommended update frequency", the "Recommended update time", and the "Next update time and date of cache". In the service/metadata accumulator 19, a portion which stores therein the update requirement corresponding to the service in All Caching Method corresponds to "a first update-requirement storage", whereas a portion which stores therein the update requirement per registration query in response to the service in Query-based Caching Method corresponds to "a second update-requirement storage".

"Cache effective period" is an effective period of a cache, and is determined in a cache update frequency/time determiner 16 which will be explained later on. The cache effective period is set only when the caching method is Query-based Caching Method. The cache effective period is set as, for example, 10 days.

The cache manager 18, which will be explained later on, determines "Cache erasure time and date" by using the last update time and date and the above cache effective period. For example, given that the last update time is 2008/04/03 AM10:00 and the cache effective period is 10 days, the cache erasure time and date is 2008/04/13 AM10:00.

As stated above, the service/metadata information accumulator 19 accumulates metadata therein. The metadata is accumulated in units of a service in regard to the service in which the caching method is All Caching Method, whereas in regard to the service in which the caching method is Query-based Caching Method, the metadata is accumulated in units of a registration query. A portion which stores therein the metadata in units of a service corresponds to "a first metadata storage" of the present invention, whereas a portion which stores therein the metadata in units of a registration query corresponds to "a second metadata storage" of the present invention.

[Caching Method Determiner 15]

A caching method determiner 15 determines the caching method with respect to the respective services registered in the service/metadata information accumulator 19. The caching method determined here is registered in the service/metadata information accumulator 19 through the cache manager 18. The caching method selects either method of, for example, (1) or (2) described below.

(1) All Caching Method

This method is a method which has previously cached all metadata held (provided) by a service. When the caching of all the metadata is completed, only a difference therebetween is periodically updated afterward. A metadata update is performed based on the next update time and date of cache managed by the service/metadata information accumulator 19. All Caching Method corresponds to "a preliminary accumulation method" of the present invention.

(2) Query-Based Caching Method

This method does not previously cached the metadata held (provided) by the service, but caches only those of the high-order number per searched search condition (a search formula). The high-order number has been determined as, for example, 500, per service, and the metadata providing device is requested to transmit the metadata up to the high-order number (500). Note that the metadata providing device may be requested to transmit all of the metadata coincident with the search condition, and when the number of transmitted metadata exceeds the high-order number, only the metadata of the high-order number may be selected. In this case, a selection reference may be arbitrary, and may be, for example, the metadata of the high-order number early obtained. In a case where a priority is attached to the metadata, the metadata of the high-order number may be selected from those having the higher priority.

This method collects the metadata coincident with the search condition from the metadata providing device only at the time of a first search, and afterward, performs updates in units of the search (that is, in units of a query) periodically at an update timing. In the update, a cache is erased to obtain the metadata again per registration query (search condition) up to the maximum number. Alternatively, if it is possible to obtain only a difference without clearing the cache once, only the difference is obtained again. However, the number of caches of each registration query shall be up to a certain maximum number.

The metadata update (a cache update) is performed based on the next update time and date of cache registered in the service/metadata information accumulator 19. In addition, erasure of a cache is performed based on the cache erasure time and date registered in the service/metadata information accumulator 19. Note that in this method, the cache effective period is arranged, and after elapse of the time, the cache is cleared. In the above explanation, only the metadata of the high-order number is cached, however, all of the metadata coincident with the search condition may be cached. Query-based Caching Method corresponds to "a search-based accumulation method" of the present invention.

Here, the caching method determiner 15 determines the caching method in accordance with any one of indexes (A) to (C) described below. When using any one of the indexes, the determination shall be performed while putting priority on capacity of the metadata information accumulator 19, in other words, a hard disk or a memory.

(A) Manual

A user determines the caching method per service. For example, a pop-up is displayed, and a user determines the caching method.

(B) Pre-Configure

The caching method per service has been previously registered in the service/metadata information accumulator 19. For example, in a high-quality VoD video service, the number of content is limited, so that All Caching Method has been registered, whereas in the video posting service, the number of content is extremely large, so that Query-based Caching Method has been registered.

(C) Auto

This index automatically determines the caching method per service. The determination is based on any one of determination references described below. However, it is not limited thereto, and any determination reference may be used as far as the caching method can be determined.

When it is possible to obtain the total number of held content (total number of metadata) from the service, and when the total number of content (total number of metadata) is equal to or less than a threshold value, All Caching Method is determined, and otherwise, Query-based Caching Method is determined. The above threshold value may be fixed value, or may be determined based on the capacity of the hard disk.

The caching method is determined depending on a kind or quality of the network, not in units of a service but in units of a network. For example, All Caching Method is determined in regard to the service provided by the metadata providing device on a home network or the network of which quality is managed, whereas Query-based Caching Method is determined in regard to the service provided by the metadata providing device on the Internet. Additionally, with respect to the network on which content is distributed by DLNA (Digital Living Network Alliance), All Caching Method is determined, whereas with respect to other networks, Query-based Caching Method is determined.

The caching method is determined depending on a type of the service. For example, with respect to a charged service, All Caching Method is determined, whereas with respect to a free service, Query-based Caching Method is determined.

The caching method is determined depending on the update frequency of the metadata. The update frequency of the metadata relates closely also to the total number of metadata, so that the service in which the update frequency of the metadata is low is considered as that the total number of content is also low. For example, with respect to the service in which the update frequency is low, a cache is not updated many times, so that All Caching Method is determined, whereas with respect to the service in which a cache is frequently updated, Query-based Caching Method is determined.

[Cache Update Frequency/Time Determiner 16]

The cache update frequency/time determiner 16 determines the recommended update frequency and the recommended update time of a cache as well as the cache effective period by an instruction from the cache manager 18 in units of an update (in units of a service or in units of a registration query) depending on the caching method, and registers the recommended update frequency and the recommended update time of a cache as well as the cache effective period in the service/metadata information accumulator 19. The recommended update frequency, the recommended update time, and the cache effective period may be determined in the cache update frequency/time determiner 16, however, may have been previously registered in the service/metadata information accumulator 19 per service. The recommended update frequency corresponds to "the update frequency of the metadata storage" of the present invention, whereas the recommended update time corresponds to "the update period of time of the metadata storage" of the present invention.

A cache update unit differs depending on the caching method. All Caching Method employs an update in units of a service, whereas Query-based Caching Method employs an update in units of a registration query. Additionally, only when the caching method is Query-based Caching Method, a cache is erased and the cache effective period is registered.

The cache update frequency/time determiner 16 determines the recommended update frequency, the recommended update time, and the cache effective period by means of methods as follows.

(A) Recommended Update Frequency

The recommended update frequency is determined based on the view frequency or the search frequency registered in the service/metadata information accumulator 19. With respect to the content having the high view frequency or search frequency, the recommended update frequency is set with a high value, and in the contrary, with respect to the content having the low view frequency and search frequency, the recommended update frequency is set with a low value. The recommended update frequency is determined depending on the view frequency, as the following, for example, "Given that the view frequency is equal to or less than five times, the recommended update frequency is performed every other day; given that the view frequency is six to ten times, the recommended update frequency is performed every twelve hours; and given that the view frequency is equal to or more than eleven times, the recommended update frequency is performed every six hours". The recommended update frequency may have been previously registered in the service/metadata information accumulator 19 without using the cache update frequency/time determiner 16. In this case, for example, with respect to the content which will be displayed on a top screen at the time of starting the ECG application, it is desirable to keep the content always in a latest state, so that with respect to the service having such content or the registration query associated with the metadata of such content, the recommended update frequency is set with a high value.

(B) Recommended Update Time

The recommended update time is determined based on an increasing number of metadata provided by the metadata providing device every a unit time. For example, given that the total number of metadata is obtained from the metadata providing device every a unit time and a variation of an increase in the number of metadata is "AM10:00: 10, PM2:00: 10, PM6:00: 20, PM10:00: 100", the recommended update time is determined as PM10:00 or the like.

The recommended update time may have been previously registered in the service/metadata information accumulator 19 without using the cache update frequency/time determiner 16. In this case, with respect to the service that it is known that a cache will be frequently updated at a specific time, the time is registered as the recommended update time. For example, when it is previously known that metadata is updated at a turn of a day like a broadcast service, the turn of a day is registered as the recommended update time.

(C) Cache Effective Period

Depending on the search frequency or the view frequency, the cache effective period is set. For example, like the following as "Given that the view frequency is equal to or less than five times, the cache effective period is three days; given that the view frequency is six to ten times, the cache effective period is ten days; and given that the view frequency is equal to or more than eleven times, the cache effective period is twenty days", the cache effective period is determined depending on the view frequency or the search frequency.

[Metadata Obtainment/Update Requesting Unit 17]

A metadata obtainment/update requesting unit 17 requests for the metadata obtainment to the metadata providing device in response to the metadata obtainment request from the cache manager 18. From the cache manager 18, the metadata collection speed, the number of obtained metadata, and the service information (for example, the information for metadata obtainment) are passed, and based thereon, the metadata obtainment/update requesting unit 17 obtains the metadata. The metadata collection speed shall be obtained every time the metadata obtainment/update requesting unit 17 requests for the metadata obtainment to the metadata providing device.

For example, explained below is an example in a case where "the metadata collection speed: 100 per one request, the number of metadata obtainment: 500, the service information: a metadata obtainment URL of the metadata providing device" are passed to the metadata obtainment/update requesting unit 17.

When 100 are obtained at an initial request and the next request is made to the metadata providing device, the metadata collection speed is obtained again. At that time, if the metadata collection speed is changed to 10 because of a surge in the CPU load or the like due to the start of other applications etc., the metadata is obtained depending on its obtainment speed. By repeatedly performing the above operations, the metadata is obtained until the total number of metadata obtainment.

[Cache Manager 18]

The cache manager 18 confirms, with respect to each of the services registered in the service/metadata information accumulator 19, whether or not the caching method in regard to each of the services has been registered, and with respect to the service having not been registered, the cache manager 18 requests the caching method determiner 15 to determine the caching method, and then, registers in the service/metadata information accumulator 19 the caching method determined by the caching method determiner 15.

The cache manager 18 executes the following processing only at an initial time with respect to the service in which All Caching Method has been registered. That is, the cache manager 18, from the metadata providing device relevant to the service, obtains all the metadata held by the metadata providing device, and in association with the aforementioned service, stores the metadata in the service/metadata information accumulator 19. This processing corresponds to processing of "a metadata-obtainment processing unit" of the present invention, and the cache manager 18 includes the metadata-obtainment processing unit.

In the obtainment request for metadata, the metadata collection speed is passed from the metadata collection speed determiner 14, and is specified to the metadata obtainment/update requesting unit 17 together with the search object service.

Additionally, when a search query (it has the search condition and the search object service) is provided from the user interface unit 11, the cache manager 18 judges the caching method of the search object service.

In a case of All Caching Method, in the metadata having been previously obtained with respect to the search object service, the cache manager 18 searches the metadata coincident with the search condition, and displays the found metadata through the user interface unit 11. This corresponds to processing of "a first search processing unit" of the present invention.

In a case of Query-based Caching Method, the cache manager 18 judges whether or not the registration query coincident with the search condition in the search query exists, and when the registration query exists, the cache manager 18 obtains the metadata corresponding to the registration query from the metadata/information accumulator 19, and displays the registration query through the user interface unit 11. When the registration query coincident with the search condition does not exist, the cache manager 18 performs the obtainment request for metadata to the metadata obtainment/update requesting unit 17, and displays the obtained metadata through the user interface 11, and stores the metadata in the service/metadata information accumulator 19 in association with the search condition (registration query) in the search object service. This corresponds to processing of "a second search processing unit" of the present invention. At the time of the obtainment request for metadata, the caching manager 18 obtains the metadata collection speed from the metadata collection speed determiner 14, and passes the metadata collection speed to the metadata obtainment/update requesting unit 17 as well as the search object service, the search condition, and the number of metadata collection.

Note that in the metadata (for example, the content list) displayed through the user interface unit 11, upon being specified certain metadata (specification of certain content), the cache manager 18 may download the content corresponding to the specified metadata from a content server which manages the content (the metadata providing device may have a function of the content server), and may pass the content to a content processing unit (not shown in the drawings) which processes the content. In this time, an address of the content server is included, for example, in the metadata.

Additionally, when the search query exists; when the metadata is newly obtained; or when the metadata of a cache is updated etc., the cache manager 18 instructs the cache update frequency/time determiner 16 to determine the recommended update frequency and the recommended update time of cache as well as the cache effective period. Then, the cache manager 18 registers in the service/metadata information accumulator 19 the determined recommended update frequency, recommended update time, and cache effective period. Note that the determination and the registration of the cache effective period are performed only with respect to the service in Query-based Caching Method.

In addition, the cache manager 18 determines the next update time and date of cache by using the recommended update time, the recommended update frequency, and the last update time and date, and registers the next update time and date of cache in the service/metadata information accumulator 19.

Moreover, the cache manager 18 determines the cache erasure time and date by using the cache effective period and the last update time and date, and registers the cache erasure time and date in the service/metadata information accumulator 19. In determining the next update time and date of cache, it does not matter on which of the recommended update frequency or the recommended update time priority is put. For example, given that the last update time: 2008/04/03 PM4:00; the recommended update frequency: 2 days; and the recommended update time: AM3:00, it makes no difference whether the next update time and date of cache is 2008/04/05 PM4:00 or 2008/04/05 AM3:00. The determination of the cache erasure time and date is performed only in a case of Query-based Caching Method.

Further, the cache manager 18 periodically monitors the service information registered in the service/metadata information accumulator 19, and updates/erases a cache. In other words, the cache manager 18 confirms the next update time and date of cache (update requirement) and the cache erasure time and date, and when the cache erasure time and date elapses, the cache manager 18 erases the cache, and when a cache update time and date elapses (when the update requirement is established), the cache manager 18 executes update processing of the metadata. Note that the erasure of the cache is performed only in a case of Query-based Caching Method. The cache manager 18 has "a first judging unit" for judging whether or not the update requirement with respect to the service in All Caching Method has been established and "a first update processing unit" for updating the metadata with respect to the service of which update requirement has been established. Additionally, the cache manager 18 has "a second judging unit" for judging whether or not the update requirement has been established per registration query with respect to the service in Query-based Caching Method and "a second update processing unit" for updating the metadata with respect to a combination of the service and the registration query, of which update requirement has been established.

[Operation Sequence]

Hereinafter, an operation sequence of the metadata collecting device 101 in FIG. 2 will be explained by separating the operation sequence into three parts of (1) at the time of starting the metadata collecting device 101, (2) the update timing of the cached metadata, and (3) an occurrence of the search query from a user (interface).

(1) At the Time of Starting the Metadata Collecting Device 101

Figure 3:
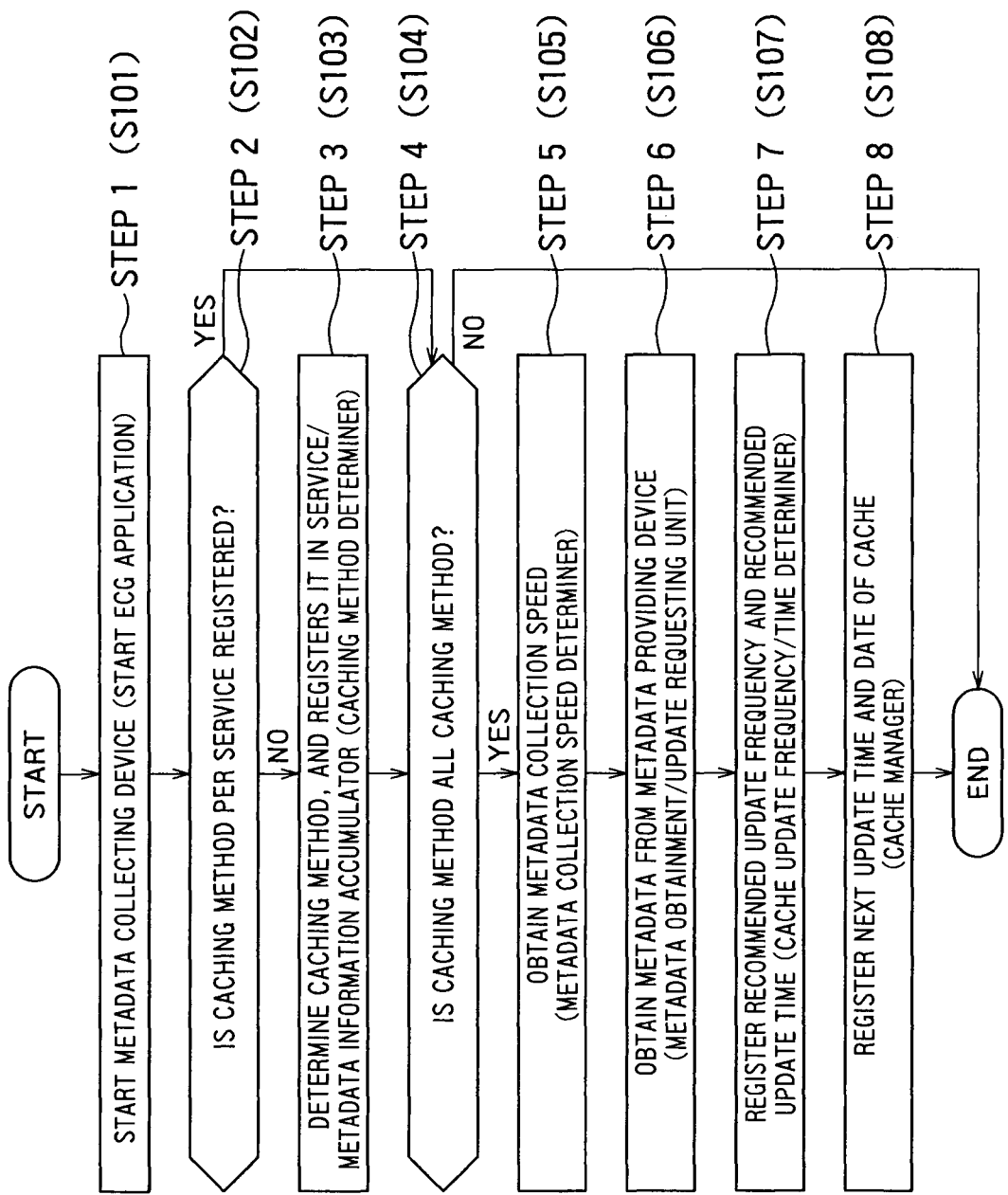
FIG. 3 is a flow chart showing an operational example at the time of starting the metadata collecting device.
Figure 4:
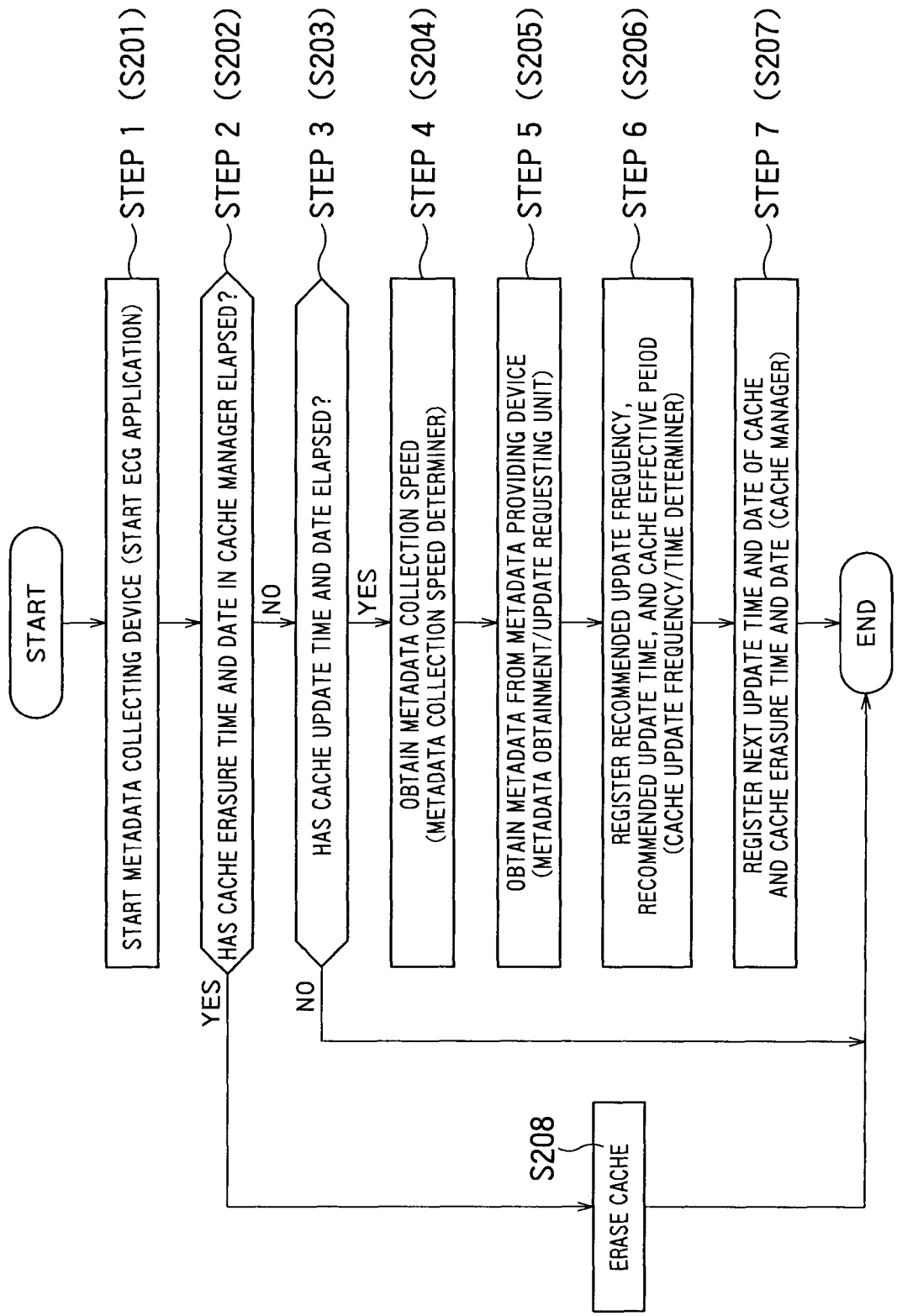
FIG. 4 is a flow chart showing another operational example at the time of starting the metadata collecting device.

Each of FIGS. 3 and 4 is a flow chart explaining the operation sequence executed at the time of starting the metadata collecting device 101. Here, the starting of the metadata collecting device 101 means starting of the metadata collection application like ECG.

(At the Time of an Initial Start)

Explained below is a sequence when the metadata of the content is not at all cached to the service/metadata information accumulator 19 at the time of starting the ECG application, with reference to FIG. 3. Note that explained afterward is the sequence focused on one service, however if a plurality of services exist, it is only necessary that these sequences be processed in parallel, alternatively, that after a certain service finishes, the next service be processed.

In Step 1, the metadata collecting device 101 is started. In other words, the ECG application is started. (S101).

In Step 2, confirmed is whether or not the caching method is registered per service stored in the service/metadata information accumulator 19 (S102). When the caching method has been determined with respect to each of the services (YES), the step moves to Step 4. When the service of which caching method has not been determined (NO) exists, the step moves to Step 3.

In Step 3, in the caching method determiner 15, the caching method is determined per service, and is registered in the service/metadata information accumulator 19 (S103). The determination of the caching method is performed based on the above-mentioned judgment reference. The caching method is either one of All Caching Method or Query-based Caching Method.

In Step 4, judged is whether or not the caching method of the service on which attention is focused is All Caching Method (S104). When the caching method is All Caching Method, the step moves to Step 5. When the caching method is Query-based Caching Method, the processing ends.

In Step 5, the metadata collection speed determiner 14 determines the metadata collection speed (S105).

In Step 6, the cache manager 18 transmits to the metadata obtainment/update requesting unit 17 the metadata collection speed determined in Step 5, and further, the number of metadata to be collected and the service information (for example, the information for metadata obtainment), and the metadata obtainment/update requesting unit 17 collects the metadata from the metadata providing device based on those pieces of information (S106). Because of All Caching Method, the number of metadata to be collected is all of the metadata held by the metadata providing device. Note that even in a case of All Caching Method, depending on the capacity of the hard disk or the like, the number of metadata to be collected may be concretely calculated and only the metadata of the calculated number of metadata may be collected.

In Step 7, in the cache update frequency/time determiner 16, the recommended update frequency and the recommended update time are determined, and are registered in the service/metadata information accumulator 19 (S107).

In Step 8, in the cache manager 18, the next update time and date of cache is determined based on the recommended update frequency and the recommended update time, and is registered in the service/metadata information accumulator 19 (S108). And then, this sequence finishes.

(At the Time of the Second and Succeeding Start)

Hereinafter, explained is an operation sequence at the time of the second and succeeding start of the metadata collecting device 101 with reference to FIG. 4. Note that the service/metadata information accumulator 19 has registered therein the caching method per service, and with respect to the service in at least All Caching Method, a cache thereof has been already stored. This sequence is directed to a case where the start of the metadata collecting device interlocks with the start of the ECG application. Therefore, a case where the ECG application is always started (even when a power source is turned off, the ECG application is started in the background) does not apply to this sequence. Note that explained afterward is the sequence focused on one service, however if a plurality of services exist, it is only necessary that these sequences be processed in parallel, alternatively, that after a certain service finishes, the next service be processed.

As shown in FIG. 4, in Step 1, the metadata collecting device 101 is started (S201). In other words, the ECG application is started.

In Step 2, confirmed is whether the cache erasure time and date registered in the service/metadata information accumulator 19 elapses per service in Query-based Caching Method (S202). When the cache erasure time and date has elapsed (YES), a cache is erased (S208), and this sequence ends. When the cache erasure time and date has not elapsed (NO), the step moves to Step 3.

In Step 3, confirmed is whether or not the cache update time and date registered in the service/metadata information accumulator 19 has elapsed (S203). When the cache update time and date has elapsed (YES), the step moves to Step 4. When the cache update time and date has not elapsed (NO), this sequence ends.

In Step 4, the metadata collection speed determiner 14 determines the metadata collection speed (S204).

In Step 5, the cache manager 18 transmits to the metadata obtainment/update requesting unit 17 the metadata collection speed determined in Step 4, and further, the number of metadata to be collected and the service information (for example, the information for metadata obtainment), and based on those pieces of information, the metadata obtainment/update requesting unit 17 collects the metadata from the metadata providing device (S205). Note that the transmission of the number of metadata to be collected is performed only in a case of Query-based Caching Method. In collecting the metadata, in a case of All Caching Method, only a difference is collected from the metadata providing device, whereas in a case of Query-based Caching Method, the metadata of the number of metadata to be collected (of the high-order number) requested from the cache manager 18 is collected from the metadata providing device.

In Step 6, in the cache update frequency/time determiner 16, the recommended update frequency, the recommended update time, and the cache effective period are determined, and are registered in the service/metadata information accumulator 19 (S206). Note that, the effective period is determined and registered only in a case of Query-based Caching Method.

In Step 7, in the cache manager 18 the next update time and date of cache and the cache erasure time and date are determined based on the recommended update frequency, the recommended update time, and the cache effective period, and are registered in the service/metadata information accumulator 19 (S207). And then, this sequence ends. Note that the cache erasure time and date is determined and registered only in a case of Query-based Caching Method.

(2) Update/Erasure Timing of Cache

Figure 5:
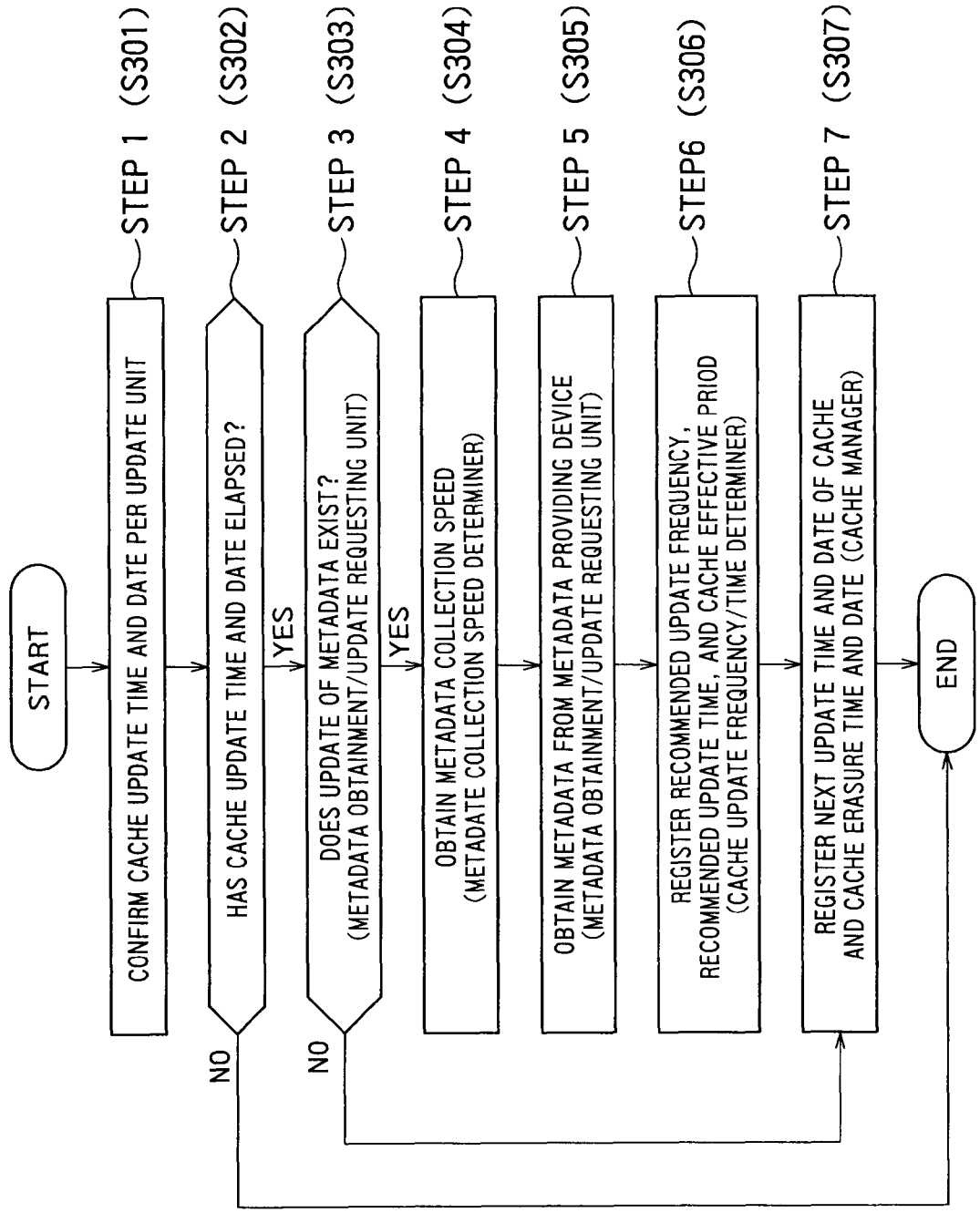
FIG. 5 is a flow chart showing an operational example at the time of updating cached metadata.
Figure 6:
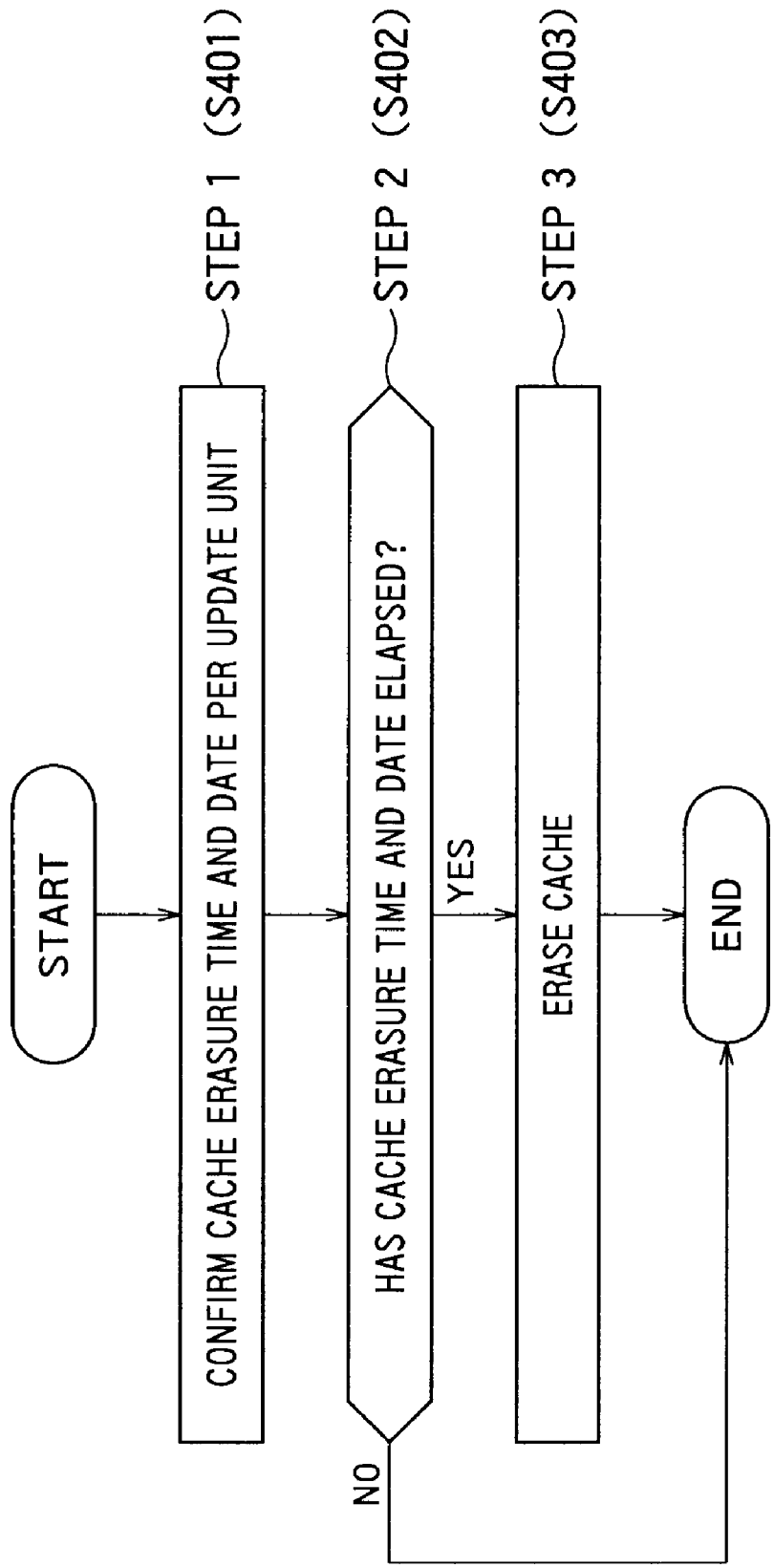
FIG. 6 is a flow chart showing an operational example at the time of erasing the cached metadata.

Next, explained is an operation sequence in a cache-update/erasure timing with reference to FIGS. 5 and 6. Explained afterward is the sequence focused on one service, however if a plurality of services exist, it is only necessary that these sequences be processed in parallel, alternatively, that after a certain service finishes, the next service be processed.

(Cache-Update Timing)

FIG. 5 is a flow chart explaining the operation sequence in the cache-update timing.

In Step 1, confirmed is the cache update time and date registered in the service/metadata information accumulator 19 in the service on which attention is focused (S301). When the caching method of the service is Query-based Caching Method, the update time and date is confirmed per registration query, whereas in a case of All Caching Method, confirmed is the only-one-registered update time and date.

In Step 2, confirmed is whether or not the cache update time and date obtained in Step 1 has passed the present time (S302). When the cache update time and date has not passed it (NO), this sequence ends. Meanwhile, when the cache update time and date has passed it (YES), the step moves to Step 3.

In Step 3, the metadata obtainment/update requesting unit 17 confirms to the metadata providing device whether or not the update of the metadata exists per update unit (in a case of Query-based Caching Method, the registration query, or in a case of All Caching Method, the service) (S303). When the update of the metadata exists, the step moves to Step 4. Meanwhile, when the update thereof does not exist, the step moves to Step 7.

In Step 4, the metadata collection speed determiner 14 determines the metadata collection speed (S304).

In Step 5, in accordance with the metadata collection speed and the number of metadata to be collected determined in Step 4, the metadata is collected from the metadata collecting device, and formats of the collected metadata are unified in the metadata format unifier 12, and then, the unified metadata is accumulated in the service/metadata information accumulator 19 (S305). In a case of All Caching Method, only a difference is obtained, and the obtained difference is added to the service/metadata information accumulator 19. This difference includes not only the metadata on new content, but also the metadata updated by the metadata providing device side with respect to the existed content. In the latter case, overwritten is the metadata before being updated which originally exists in the service/metadata information accumulator 19. In a case of Query-based Caching Method, the metadata of the maximum number of caches per query is obtained, and is accumulated in the service/metadata information accumulator 19. When the metadata of the content same as the obtained metadata already exists in the service/metadata information accumulator 19, the existed metadata is overwritten.

In Step 6, in the cache update frequency/time determiner 16, the recommended update frequency, the recommended update time, and the cache effective period are determined, and are registered in the service/metadata information accumulator 19 (S306). Note that the effective period is determined and registered only in a case of Query-based Caching Method.

In Step 7, in the cache manager 18, based on the recommended update frequency, the recommended update time, and the cache effective period, the next update time and date of cache and the cache erasure time and date are determined, and are registered in the service/metadata information accumulator 19 (S307). Then, this sequence ends. Note that the cache erasure time and date is determined and registered only in a case of Query-based Caching Method.

(Cache Erasure Timing)

FIG. 6 is a flow chart explaining an operation sequence in the cache erasure timing. This operation sequence is performed only in a case of the service in Query-based Caching Method.

In Step 1, confirmed is the cache erasure time and date registered in the service/metadata information accumulator 19 per registration query (S401).

In Step 2, confirmed is whether or not the cache erasure time and date obtained in Step 1 has passed the present time (S402). When has not passed (NO), this sequence ends. On the other hand, when has passed (YES), the step moves to Step 3.

In Step 3, erased is a cache (metadata) corresponding to the registration query having passed the cache erasure time and date (S403), and this sequence ends.

(3) An Occurrence of the Search Query From a User

Figure 7:
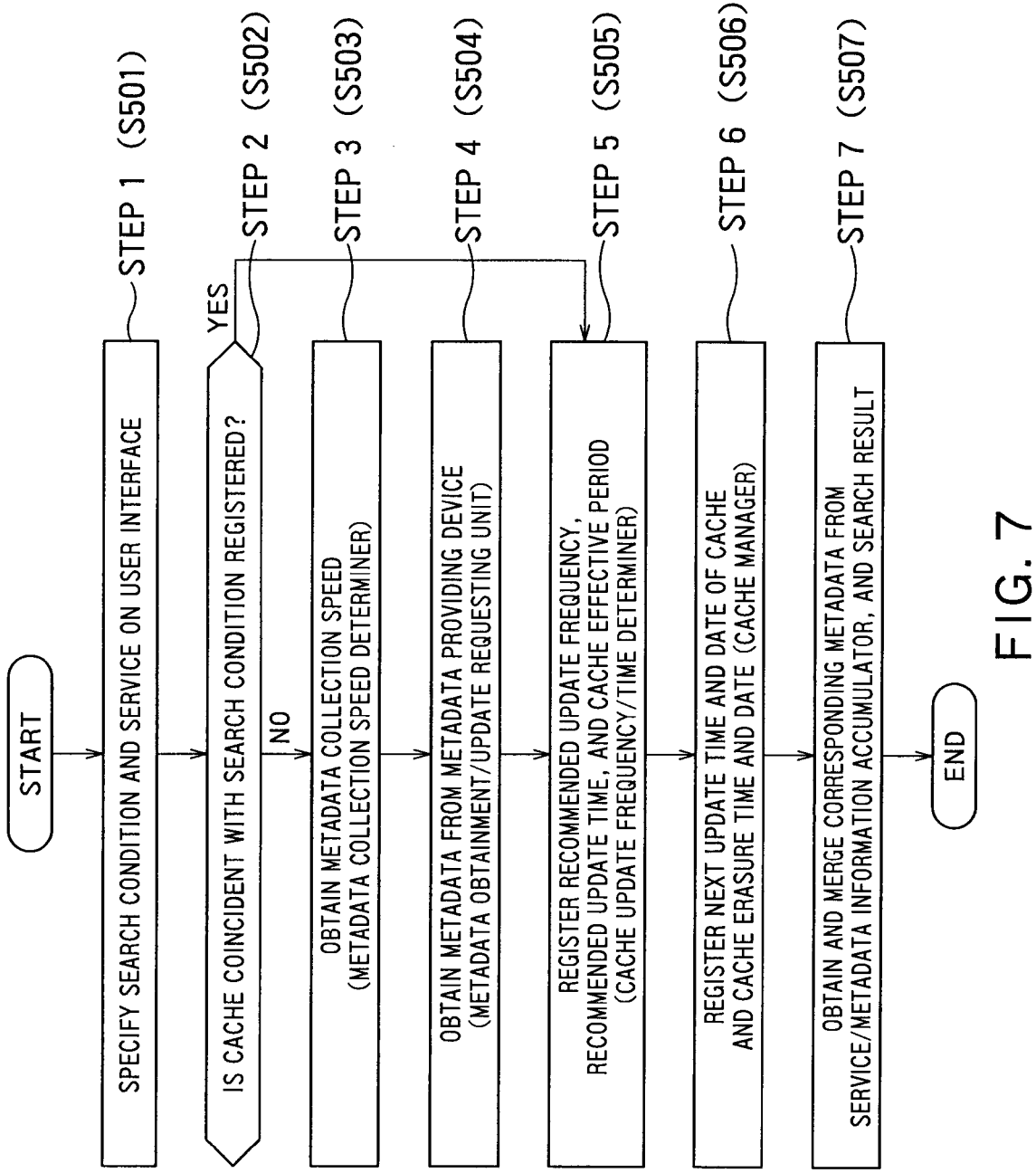
FIG. 7 is flow chart showing an operation at the time of an occurrence of a request for metadata obtainment from a user.

Next explained is an operation sequence when the search query occurs from a user, with reference to FIG. 7.

FIG. 7 is a flow chart explaining the operation sequence when the search query occurs from a user.

In Step 1, specified are the search condition and the search object service of the content on the search screen as shown in FIG. 10 (S501). In the example of FIG. 10, "sport" is specified in "Genre", whereas "tennis" is specified in "Keyword" as the search conditions, and "High-quality VoD service" and "video posting service" are specified as the search object services. The search conditions may include promotional information etc. such as recommended content or newly arrived content, in addition to "Genre" and "Keyword". The search query in which the search condition and the search object service have been specified is transmitted from the user interface unit 11 to the cache manager 18.

In Step 2, the cache manager 18 judges a caching memory method based on the search query received in Step 1 per the specified service in the service/metadata information accumulate 19. In a case of All Cashing Method, the step unconditionally moves to Step 5, whereas in a case of Query-based Caching Method, the step follows a procedure described below. That is, it is determined whether or not the registration query coincident with the search condition included in the search query is registered in the service/metadata information accumulator 19, and when registered (YES in S502), the step moves to Step 5, whereas when not registered (NO in S502), the step moves to Step 3.

For example, given that the service information shown in FIGS. 8 and 9 is registered in the service/metadata information accumulator 19, in a case of the high-quality VoD service, because of All Cashing Method, the step moves to Step 5. On the other hand, in the video posting service, registered is only the registration query like "Genre: sport, Keyword: tennis" as a cache, and therefore, when the search condition same as this registration query is specified, the step moves to Step 5, whereas when the search condition different from this registration query is specified, the step moves to Step 3.

In Step 3, the metadata collection speed determiner 14 determines the metadata collection speed (S503).

In Step 4, the cache manager 18 transmits to the metadata obtainment/update requesting unit 17 the metadata collection speed determined in Step 3, and further, the number of metadata to be collected (the high-order number) and the service information (for example, the information for metadata obtainment), and based on those pieces of information, the metadata obtainment/update requesting unit 17 collects the metadata from the metadata providing device (S504).

Here, from the viewpoint of presenting a search result as soon as possible in obtaining the metadata, the step may move to Step 5 not after obtaining all the metadata of the abovementioned number of metadata to be collected, but at the time of obtaining the metadata of the minimum-required number. For example, given that the number of metadata possible to be displayed on one screen is five and the number of metadata to be collected requested from the cache manager 18 is 500, after obtaining 20 also in consideration of transition of the screen, the step proceeds to Step 5, and the remaining 480 (=500–20) may be sequentially obtained after displaying the search result.

In Step 5, in the cache update frequency/time determiner 16, the recommended update frequency, the recommended update time, and the cache effective period are determined, and are registered in the service/metadata information accumulator 19 (S505). Then, the step moves to Step 6. Note that the cache effective period is determined only with respect to the service in Query-based Caching Method.

In Step 6, in the cache manager 18, based on the recommended update frequency, the recommended update time, and the cache effective period, the next update time and date of cache and the cache erasure time and date are determined, and are registered in the service/metadata information accumulator 19 (S506). Note that the cache erasure time and date is determined and registered only with respect to the service in Query-based Caching Method.

In Step 7, all of the metadata are obtained from the service/metadata information accumulator 19 with respect to all of the services to be searched (S507). That is, with respect to the service in Query-based Caching Method, obtained is the metadata associated with the registration query coincident with the search condition from the service/metadata information accumulator 19, whereas with respect to the service in All Cashing Method, the metadata coincident with the search condition is detected and obtained from the service/metadata information accumulator 19. Then, the user interface unit 11 merges and displays the metadata obtained from the service/metadata information accumulator 19 (S507). FIG. 11 shows the example of the displayed metadata. Here, a merge method may employ any kind of method, and it is possible to employ the merge method in which a display is performed in the order of date or name.

As stated above, according to the embodiment of the present invention, the following effects can be obtained.

(1) It is possible to efficiently cache the metadata by selecting the cashing method of the metadata, per service, suitable therefor.

(2) It is possible to efficiently update the cached metadata. It is possible, for example, to keep the metadata of high-demand content in the latest state, whereas it is possible to prevent the metadata of low-demand content from being meaninglessly updated.

(3) It is possible to minimize an influence on other applications of a receiving terminal due to the metadata collection. Additionally, it is possible to minimize an influence due to a disturbance by setting the metadata collection speed in consideration of the network load or a metaserver load.

The metadata collecting device of this embodiment may also be realized using a general-purpose computer device as basic hardware. That is, the user interface unit 11, the metadata format unifier 12, the terminal/server/network load monitor 13, the metadata collection speed determiner 14, the caching method determiner 15, the cache update frequency/time determiner 16, the metadata obtainment/update requesting unit 17, the cache manager 18, and the network interface unit 20 can be realized by causing a processor mounted in the above described computer device to execute a program. In this case, the metadata collecting device may be realized by installing the above described program in the computer device beforehand or may be realized by storing the program in a storage medium such as a CD-ROM or distributing the above described program over a network and installing this program in the computer device as appropriate. Furthermore, the service/metadata information accumulator 19 may also be realized using a memory device or hard disk incorporated in or externally added to the above described computer device or a storage medium such as CD-R, CD-RW, DVD-RAM, DVD-R as appropriate.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. A metadata collecting device which collects and accumulates metadata from one or more metadata providing devices holding metadata of contents distributed by one or more content distribution services, comprising:

an accumulation-method determiner configured to determine accumulation methods of the metadata for the content distribution service to either a preliminary accumulation method or a search-based accumulation method, respectively;

an accumulation-method storage configured to store therein information on the accumulation methods determined for the content distribution services;

a metadata-obtainment processing unit configured to transmit, to the metadata providing device relevant to a first content distribution service for which the preliminary accumulation method has been determined, an obtainment request of the metadata held by the metadata providing device and to obtain the metadata returned from the metadata providing device;

a first metadata storage configured to store therein the metadata obtained by the metadata-obtainment processing unit in association with the first content distribution service;

a search inputting unit configured to input a search object service which is the content distribution service to be searched and a search condition of the contents, respectively;

a second metadata storage configured to, with respect to a second content distribution service for which the search-based accumulation method has been determined, store the search condition having been ever searched and metadata obtained corresponding to the search condition, in association with the second content distribution;

a first search processing unit configured to, when the accumulation method corresponding to an inputted search object service is the preliminary accumulation method, search the metadata coincident with an inputted search condition based on the inputted search object service in the first metadata storage;

a second search processing unit configured to, when the accumulation method corresponding to the inputted search object service is the search-based accumulation method, determine whether or not the inputted search object service and the inputted search condition is registered in the second metadata storage, and when registered, obtain the metadata coincident with the inputted search condition based on the inputted search object service from the second metadata storage, whereas when not registered, transmit, to the metadata providing device relevant to the inputted search object service, an obtainment request of the metadata coincident with the inputted search condition and accumulate the metadata returned from the metadata providing device in the second metadata storage in association with the inputted search condition; and a search-result displaying unit configured to display the metadata acquired by the first or the second search processing unit.

2. The device according to claim 1, comprising:

a first update-requirement storage configured to store an update requirement of the metadata per the first content distribution service;

a first judging unit configured to judge whether or not the update requirement has been established and specify the first content distribution service for which the update requirement has been established; and a first update processing unit configured to transmit an obtainment request of the metadata held by the metadata providing device relevant to a specified first content distribution service or a obtainment request of a difference between the metadata held and the metadata in the first metadata storage with respect to the specified first content distribution service, to the metadata providing device, and to update the first metadata storage based on the metadata returned from the metadata providing device.

3. The device according to claim 2, wherein the update requirement determines an update frequency or an update period of time, or both thereof.

4. The device according to claim 1, comprising:

a second update-requirement storage configured to store therein an update requirement of the metadata per a combination of the second content distribution service and the search condition;

a second judging unit configured to judge whether or not the update requirement has been established and to specify the combination in which the update requirement has been established; and a second update processing unit configured to transmit, to the metadata providing device corresponding to the second content distribution service of the combination, an obtainment request of the metadata coincident with the search condition of the combination, or an obtainment request of a difference between the metadata held by the metadata providing device and the metadata in the second metadata storage with respect to the combination, and to update the second metadata storage based on the metadata returned from the metadata providing device.

5. The device according to claim 1, wherein the accumulation-method determiner determines the accumulation method based on a type or quality of the network to which the metadata providing device corresponding to each of the one or more content distribution services is connected, or on a type or a feature of each of the one or more content distribution services.

6. The device according to claim 1, wherein the accumulation-method determiner obtains quantity of the metadata held by each of the metadata providing devices therefrom, and determines the preliminary accumulation method for the content distribution service relevant to the metadata providing device in which the quantity of holding metadata is less than a threshold value, whereas determines the search-based accumulation method for the content distribution service relevant to the metadata providing device in which the quantity of holding metadata is equal to or greater than the threshold value.

7. The device according to claim 1, wherein the one or more metadata providing devices respectively update holding metadata at certain frequencies, and the accumulation-method determiner determines the preliminary accumulation method for the content distribution service corresponding to the metadata providing device in which an update frequency of the metadata is less than a threshold value, whereas determines the search-based accumulation method for the content distribution service corresponding to the metadata providing device in which the update frequency of the metadata is equal to or greater than the threshold value.

8. The device according to claim 1, further comprising:

an effective-period setting unit configured to set an effective period for the metadata obtained by the second search processing unit;

an effective-period storage configured to store therein the effective period in association with the inputted search object service and the inputted search condition; and an erasure configured to erase the metadata corresponding to the content distribution service and the search condition for which the effective period has elapsed, from the second metadata storage.

9. The device according to claim 8, wherein the effective-period setting unit sets the effective period according to a view frequency or a search frequency of a content corresponding to the metadata.

10. A metadata collecting method which collects and accumulates metadata from one or more metadata providing devices holding metadata of contents distributed by one or more content distribution services, comprising:

determining accumulation methods of the metadata for the content distribution service to either a preliminary accumulation method or a search-based accumulation method, respectively;

storing information on the accumulation methods determined for the content distribution services in an accumulation-method storage;

transmitting, to the metadata providing device relevant to a first content distribution service for which the preliminary accumulation method has been determined, an obtainment request of the metadata held by the metadata providing device and to obtain the metadata returned from the metadata providing device;

storing the metadata in association with the first content distribution service in a first metadata storage;

inputting a search object service which is the content distribution service to be searched and a search condition of the contents;

searching the metadata coincident with an inputted search condition based on the inputted search object service in the first metadata storage when the accumulation method corresponding to an inputted search object service is the preliminary accumulation method;

determining whether or not the inputted search object service and the inputted search condition is registered in a second metadata storage when the accumulation method corresponding to the inputted search object service is the search-based accumulation method, wherein the second meta data storage stores, with respect to a second content distribution service for which the search-based accumulation method has been determined, store the search condition having been ever searched and metadata obtained corresponding to the search condition, in association with the second content distribution;

when it is determined to be registered, obtaining the metadata coincident with the inputted search condition based on the inputted search object service from the second metadata storage;

whereas when it is determined not to be registered, transmitting, to the metadata providing device relevant to the inputted search object service, an obtainment request of the metadata coincident with the inputted search condition and accumulate the metadata returned from the metadata providing device in the second metadata storage in association with the inputted search condition; and displaying the metadata acquired according to the inputted search object service and the inputted search condition.

11. A computer readable medium storing a computer program for causing a computer to execute instructions to perform a metadata collecting method which collects and accumulates metadata from one or more metadata providing devices holding metadata of contents distributed by one or more content distribution services, the meta data collecting method comprising:

determining accumulation methods of the metadata for the content distribution service to either a preliminary accumulation method or a search-based accumulation method, respectively;

storing information on the accumulation methods determined for the content distribution services in an accumulation-method storage;

transmitting, to the metadata providing device relevant to a first content distribution service for which the preliminary accumulation method has been determined, an obtainment request of the metadata held by the metadata providing device and to obtain the metadata returned from the metadata providing device;

storing the metadata in association with the first content distribution service in a first metadata storage;

inputting a search object service which is the content distribution service to be searched and a search condition of the contents;

searching the metadata coincident with an inputted search condition based on the inputted search object service in the first metadata storage when the accumulation method corresponding to an inputted search object service is the preliminary accumulation method;

determining whether or not the inputted search object service and the inputted search condition is registered in a second metadata storage when the accumulation method corresponding to the inputted search object service is the search-based accumulation method, wherein the second meta data storage stores, with respect to a second content distribution service for which the search-based accumulation method has been determined, store the search condition having been ever searched and metadata founded corresponding to the search condition, in association with the second content distribution;

when it is determined to be registered, obtaining the metadata coincident with the inputted search condition based on the inputted search object service from the second metadata storage;

whereas when it is determined not to be registered, transmitting, to the metadata providing device relevant to the inputted search object service, an obtainment request of the metadata coincident with the inputted search condition and accumulate the metadata returned from the metadata providing device in the second metadata storage in association with the inputted search condition; and displaying the metadata acquired according to the inputted search object service and the inputted search condition.

* * * * *